United States Patent
Sugihara et al.

(10) Patent No.: US 6,437,508 B1
(45) Date of Patent: Aug. 20, 2002

(54) SHORT-ARC DISCHARGE LAMP

(75) Inventors: Masanori Sugihara; Naohisa Ikeda, both of Himeji (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/551,351

(22) Filed: Apr. 18, 2000

(30) Foreign Application Priority Data

Apr. 21, 1999 (JP) ............................. 11-114270

(51) Int. Cl.$^7$ ............................. H01J 1/14; H01J 61/86
(52) U.S. Cl. ........................................ 313/632; 313/574
(58) Field of Search ................. 313/570, 571, 313/574, 631, 632, 630

(56) References Cited

U.S. PATENT DOCUMENTS

| | | | |
|---|---|---|---|
| 3,248,586 A | 4/1966 | Schlegel | 313/37 |
| 3,248,591 A | 4/1966 | Arndt | 313/217 |
| 3,303,377 A | 2/1967 | Jansen et al. | 313/184 |
| 3,849,690 A | * 11/1974 | Cosco et al. | 313/630 |
| 4,906,895 A | 3/1990 | Pabst et al. | 313/632 |
| 5,629,585 A | 5/1997 | Altmann et al. | 313/570 |
| 5,874,805 A | * 2/1999 | Kavanagh | 313/631 |
| 5,929,565 A | * 7/1999 | Mayama et al. | 313/631 |

FOREIGN PATENT DOCUMENTS

| | | | |
|---|---|---|---|
| DE | 198 35 476 | 2/2000 | ......... H01J/61/073 |
| EP | 0 858 097 | 8/1998 | ......... H01J/61/073 |
| EP | 0 917 179 | 5/1999 | ......... H01J/61/073 |
| GB | 2 107 921 | 5/1983 | ......... H01J/61/073 |
| JP | 2-256150 | 10/1990 | ......... H01J/61/067 |
| JP | 2-304857 | 12/1990 | ......... H01J/61/073 |

OTHER PUBLICATIONS

Patent Abstracts of Japan, vol. 14, No. 584 (E–1018), Dec. 27, 1990 & JP 02 256150 A (Ushio Inc.), Oct. 16, 1990, *English Abstract*.

* cited by examiner

*Primary Examiner*—Michael H. Day
(74) *Attorney, Agent, or Firm*—Nixon Peabody LLP; David S. Safran

(57) ABSTRACT

A short-arc discharge lamp (10) including a light-emitting tube (1) having at least 15 mg/cc of mercury sealed therein, an anode (2) and cathode (3) facing each other and disposed within the light-emitting tube (1), and a heat-release layer (6) covering a substantial portion of an outer surface of the cathode (3) so that when the short-arc discharge lamp (10) is provided with electricity having a current value of at least 50 A, an inter-electrode power value defined by a ratio Y/X is at least 500 W/mm, X being defined as a distance in millimeters between the anode (2) and the cathode (3), and Y being defined as an input power in Watts provided to the short-arc discharge lamp (10).

9 Claims, 2 Drawing Sheets

SHORT-ARC DISCHARGE LAMP

BACKGROUND OF THE INVENTION

1. Field of the Invention

The present invention related to the field of short-arc discharge lamps. More specifically, the present invention relates to short-arc discharge lamps that are used for exposure of liquid crystals, color filters and print substrates.

2. Description of Related Art

Short-arc discharge lamps have been well known as light sources for exposure used in the process of manufacturing liquid crystals, the process of manufacturing color filters, and the process of manufacturing print substrates. These short-arc discharge lamps typically have mercury sealed into their light-emitting tubes so that in operation, the mercury emits ultraviolet radiation, as shown for example in the Japanese Patent No. 2-256150.

In order to properly expose the liquid crystal substrate or color filter, ultraviolet energy of about 200 mj is required. In other words, if the luminous flux density at the area of exposure is to be 10 mW/cm$^2$, the exposure will take 20 seconds.

Consequently, ways to shorten the exposure time have been considered as a method to increase productivity in the exposure process. That is, a stronger lamp for emitting the ultraviolet radiation has been sought to increase the luminous flux density at the area of exposure.

In recent years, there has been a trend toward larger liquid crystal display devices. Thus, demands for higher productivity and lower costs have brought about the use of such means as multifaceting using larger substrates. That is, as the substrates have become larger, the area for exposure has correspondingly increased, thereby necessitating use of stronger lamps to emit the ultraviolet radiation.

For the exposure of liquid crystals and print substrates, ultraviolet radiation known as g-rays, h-rays and i-rays have been used. The intensity of the ultraviolet radiation emitted by the lamps has been increased by sealing large amounts of mercury into the light-emitting tubes.

At present, lamps in the 8 kW class with about 15 mg/cc of mercury sealed into the light-emitting tubes are used as light sources for exposure.

For future productivity increases or enlargement of the substrate size, it will be necessary to have at least 15 mg/cc of mercury sealed into the light-emitting tube in order to increase the intensity of the ultraviolet light emitted.

In such lamps with at least 15 mg/cc of mercury in them, higher power will have to be input to the lamp to completely vaporize all the mercury in the light-emitting tubes. For that reason, it will be necessary to increase the anode temperature, and the current flow will generally be at least 50 A.

On the other hand, the ultraviolet radiation emitted from short-arc discharge lamps of this sort is focused on the area of exposure by mirrors and lenses within the exposure equipment. Thus, it is desirable that the arc spot be quite small in order to achieve good convergence of the ultraviolet radiation. As a result, the electrode separation between the cathode and anode has been shortened as a structural method to reduce the arc spot in discharge lamps.

Nevertheless, when the input power is increased in order to vaporize the large amount of mercury sealed into the light-emitting tube, there is inevitably a large current flow to the cathode which correspondingly causes the temperature of the cathode to rise.

Moreover, when the electrode separation is shortened to make the arc spot smaller, the space in which the energy is concentrated is also made smaller which correspondingly further increases the temperature of the cathode all the more.

Therefore, there has been a problem in that as the cathode temperature rises, the ultraviolet radiation emitted by the lamp begins to scatter so that the exposure light emitted lacks uniformity. Moreover, as the temperature of the cathode rises, the tip of the cathode vaporizes, and the tungsten of which the cathode is made, adheres to the inner wall of the light-emitting tube and blackens it. As a result of all of these factors, the amount of ultraviolet radiation passing through the light-emitting tube is quickly reduced and the intensity of ultraviolet radiation emitted by the short-arc discharge lamp drops. Ultimately, the short-arc discharge lamp must be replaced very frequently and provides a very short service life.

SUMMARY OF THE INVENTION

The short-arc discharge lamp in accordance with the present invention avoids the disadvantages of the discharge lamps described above. The present invention provides a short-arc discharge lamp with long service life and minimal scattering of the ultraviolet radiation emitted by the lamp. This is attained in accordance with the present invention, by suppressing the temperature rise in the cathode.

In order to resolve the problems described above, the short-arc discharge lamp in accordance with one embodiment of the present invention includes an anode and a cathode positioned facing each other within a light-emitting tube. The light-emitting tube is sealed an inert gas and at least 15 mg/cc of mercury. When the short-arc discharge lamp in accordance with the present invention is operated with electricity having a current value of at least 50 A, the ratio of Y/X is at least 500 (W/mm), the X being defined as the electrode separation between the anode and cathode in millimeters, and Y being defined as the input power in Watts. The outer surface of the cathode has a heat-release layer made of tungsten except at the tip.

In an alternative embodiment, the cathode may be provided with grooves on an outer surface, except at the tip, and a heat-release layer of tungsten over the grooves.

These and other objects, features and advantages of the present invention will become more apparent from the following detailed description of the preferred embodiments of the invention when viewed in conjunction with the accompanying drawings.

DETAILED DESCRIPTION OF THE INVENTION

Figure 1:
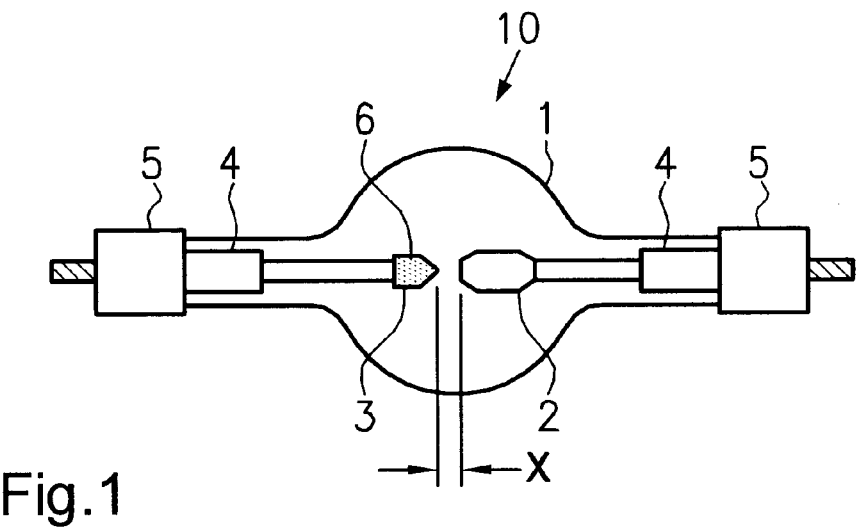
FIG. 1 is a perspective view of the short-arc discharge lamp in accordance with one embodiment of the present invention.

FIG. 1 illustrates a short-arc discharge lamp 10 in accordance with one embodiment of the present invention discussed herein below. As can be clearly seen, the short-arc discharge lamp 10 in this illustrated embodiment includes an anode 2 and a cathode 3 positioned facing each other within a light-emitting tube 1 which is preferably made of quartz glass. The anode 2 and the cathode 3 pass through their respective seals 4 and are electrically connected to current supply bases 5.

Some amount of an inert gas such as xenon, krypton or argon may be sealed in the light-emitting tube 1. The light emitting tube 1 is also sealed with mercury which is used to generate ultraviolet radiation. The anode 2 and the cathode 3 are preferably made of tungsten, and as can be seen in FIGS. 1 to 3, the tip of the cathode 3 is cone-shaped in order to improve the electrical discharge.

A heat-release layer 6 may be provided around the cathode 3, except for its tip in the manner shown, in order to suppress the rise in temperature of the cathode 3. The heat-release layer 6 may be made of tungsten powder, 3.5 to 5.0 μm thick, sintered to the outer surface of the cathode 3.

Figure 2:
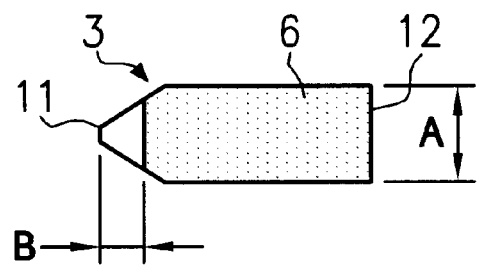
FIG. 2 is an enlarged perspective view of a cathode in accordance with one embodiment of the present invention used in the short-arc discharge lamp of FIG. 1.

More specifically, as most clearly shown in FIG. 2, the heat-release layer 6 is formed on an outer surface of the cathode 3 from a point which is at a distance B from the tip 11 to the rear 12 of the cathode 3. The outer diameter A in the illustrated embodiment may be 15 mm, and the distance B may be 5 mm. The reason that the heat-release layer 6 does not cover the tip 11 of the cathode 3 is that such coverage would obstruct the arc discharge of the cathode 3.

Figure 3:
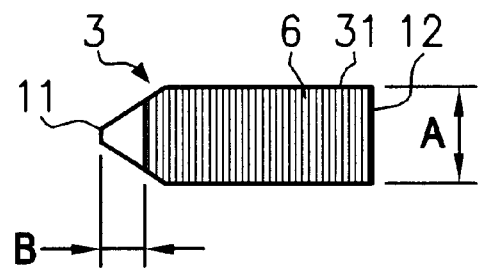
FIG. 3 is an enlarged perspective view of a cathode in accordance with another embodiment of the present invention.

As another example of a cathode in accordance with the present invention is illustrated FIG. 3, the common components being enumerated with the same numbers as the previous embodiment for clarity. As can be clearly seen, the cathode 3 as shown in FIG. 3 includes circular grooves 31 that are formed on the outer surface of the cathode 3 from a point at distance B from the tip 11 to the rear 12 of the cathode 3. It should be appreciated that instead of the circular grooves 31, the cathode 3 may alternatively be provided with a helical groove (not shown) on the outer surface. The outer diameter A in the illustrated embodiment may be 15 mm, the distance B maybe 5 mm, and the pitch of the grooves may range from 0.1 to 0.5 mm. As can be seen, a heat-release layer 6 which may be tungsten powder 3.5 to 5.0 μm thick, is preferably sintered over the grooves 31.

By providing such grooves, whether it be circular or helical, it is possible to increase the surface area of the heat-release layer 6 thereby increasing the heat releasing effect.

The short-arc discharge lamp 10 of the present invention as illustrated in FIG. 1 also has a large amount of mercury sealed into the light emitting tube 1 to increase the intensity of the vacuum ultraviolet radiation emitted. Specifically, it preferably contains no less than 15 mg/cc, and more specifically, may contain about 25 mg/cc of mercury.

In this embodiment where the amount of mercury sealed into the light-emitting tube 1 is 15/cc or more, a large power input is necessary as discussed previously to raise the temperature of the anode 2 so that all of the mercury in the light-emitting tube 1 is vaporized Consequently, the design current of the lamp should preferably be at least 50 A.

In the illustrated embodiment of FIG. 1, the short-arc discharge lamp 1 may have an input power of approximately 4300 W with a current rating of about 70A.

Moreover, as seen in FIG. 1, the electrode separation X which is the distance between the anode 3 and the cathode 2 of the short-arc discharge lamp 10 may be approximately 5 mm so that the inter-electrode power value (defined as the input power divided by the distance between the anode and the cathode) is about 860 (W/mm).

Figure 4:
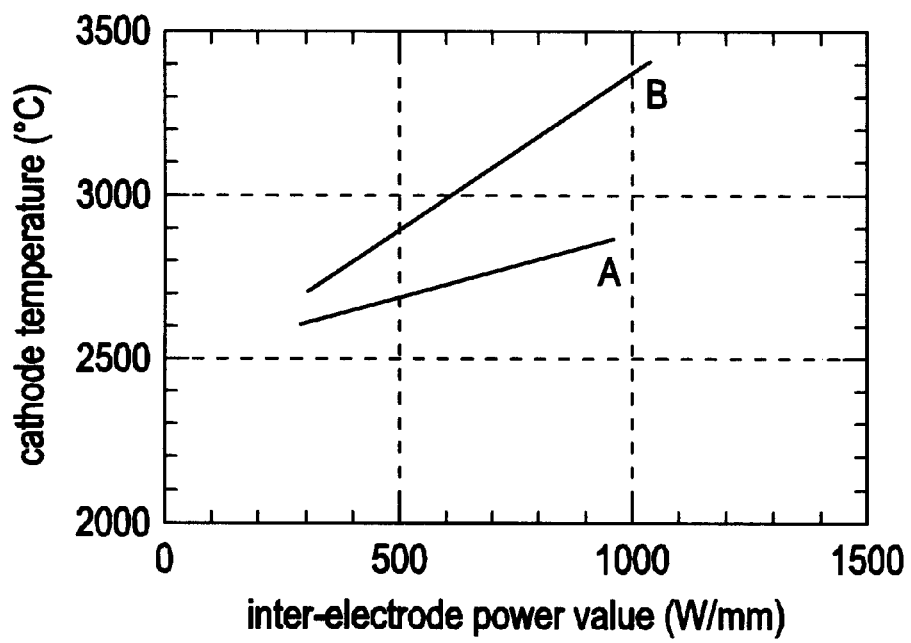
FIG. 4 is a graph of experimental data illustrating how the cathode temperature changes with changes in an interelectrode power value, with and without a heat-release layer on the cathode.

Various experiments discussed hereinbelow were conducted to investigate the relationship between the inter-electrode power value (W/mm) and the cathode temperature. Using short-arc discharge lamps 10 of the type illustrated in FIG. 1, an experiment was conducted by varying the inter-electrode power value by changing the electrode separation X and/or the input power W and by testing lamps with and without a heat-release layer over the cathode 3 in order to investigate the relationship of these factors to the cathode temperature. The cathode temperature being the temperature measured at the tip 11 of the cathode 3. The results of the experiment is shown in FIG. 4 where the vertical axis represents the cathode temperature and the horizontal axis represents the inter-electrode power value (W/mm). In addition, curve B of FIG. 4 shows the cathode temperature relationship for a cathode not having a heat-release layer. As can be seen, the temperature of the cathode tip 11 reached about 2900° C. when the inter-electrode power value was 500 (W/mm). It was learned that the temperature of the cathode tip 3 increases sharply as the inter-electrode power value (W/mm) increases. In particular, when the inter-electrode power value passed 500 (W/mm), the cathode tip 11 had a markedly high temperature of 2900 ° C. When exposing liquid crystal substrates (not shown) in this state, scattering of the ultraviolet radiation emitted by the short-arc discharge lamp occurred. Consequently, there was a lack of uniformity in the exposure of the liquid crystal substrates being exposed.

In FIG. 4, curve A shows the cathode temperature relationship for a cathode having a heat-release layer 6 on the cathode 3. As can be clearly seen, the temperature at the tip 11 of the cathode 3 does tend to rise as the inter-electrode power value (W/mm) increases, but the extent of that rise is very slight when compared with the rise in curve B which represents a cathode with no heat-release layer as discussed above.

As these results make clear, it is possible to release the heat that builds up at the cathode tip 11 by providing a heat-release layer 6. Thus, it is possible to effectively suppress the temperature of the cathode 3 itself, and particularly of the cathode tip 11 which has the highest temperature. Consequently, there is minimal scattering of the ultraviolet radiation emitted by the short-arc discharge lamp so that when the lamp is used as a light source in exposure equipment, the exposure of liquid crystal substrates or other substances being treated is uniform.

Figure 5:
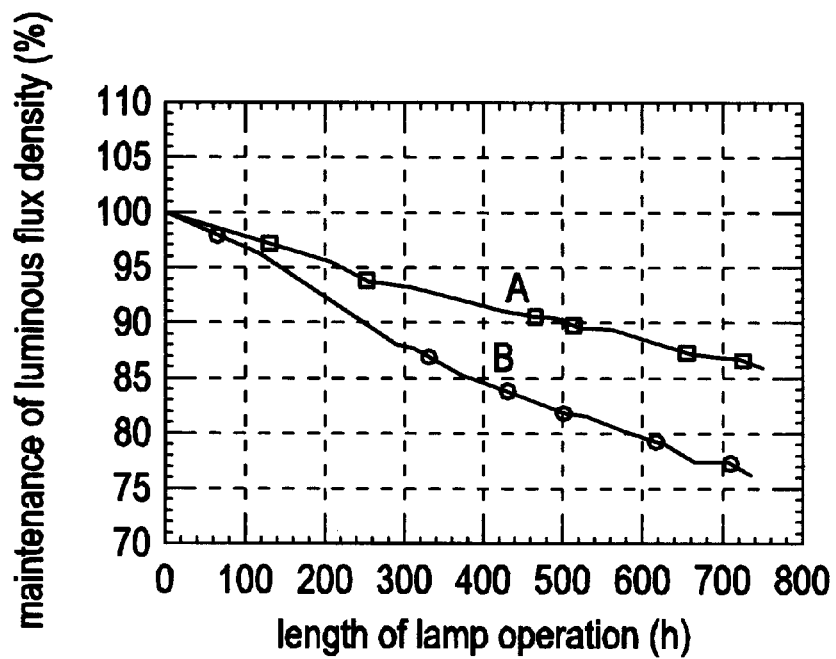
FIG. 5 is a graph of experimental data illustrating how maintenance of luminous flux density changes with the length of lamp operation for a short-arc discharge lamps in accordance with the present invention and conventional short-arc discharge lamps.

Next, the variation of luminous flux density with the passage of operating hours was measured in short-arc discharge lamps 10 of the type illustrated in FIG. 1, both with and without heat-release layers 6 on the cathodes 3. The experimental results are shown in FIG. 5. In FIG. 5, the vertical axis represents maintenance of luminous flux density in percent (%) while the horizontal axis represents the length of lamp operation in hours (h).

In FIG. 5, the variation in luminous flux density in a short-arc discharge lamp without a heat-release layer is shown by the curve B. As can be clearly seen, the luminous flux density fell to 77% after 700 hours of operation. In contrast, the variation in luminous flux density in a short-arc discharge lamp 10 with a heat-release layer 6, as shown by curve A, maintained a high 87% of luminous flux density after 700 hours of operation. Therefore, it was shown that in such an embodiment of the short-arc discharge lamp, there is little drop in luminous flux density even after a long period of operation. This consequently means that the short-arc discharge lamp would have a long service life.

Therefore, the short-arc discharge lamp in accordance with the present invention is able, by means of the heat-release layer 6, to actively release heat from the cathode 3 thereby effectively suppressing the rise of temperature in the tip 11 of the cathode 3 and also to suppressing the evaporation of the cathode tip 11. Accordingly, the short-arc discharge lamp 10 in accordance with the present invention would have a long service life and can suppress blackening of the light-emitting tube 1 due to the evaporation of cathode 3 and would maintain high luminous flux density even after a long period of operation.

Consequently, the present invention provides a short-arc discharge lamp which will avoid the disadvantages discussed above and provide long service life with minimal scattering of the ultraviolet radiation emitted by the lamp. As explained above, this is attained by suppressing the temperature rise in the cathode.

While various embodiments in accordance with the present invention have been shown and described, it is understood that the invention is not limited thereto. These embodiments may be changed, modified and further applied by those skilled in the art. Therefore, this invention is not limited to the details shown and described previously but also includes all such changes and modifications which are encompassed by the appended claims.

What is claimed is:

1. A short-arc discharge lamp comprising:
   a light-emitting tube having at least 15 mg/cc of mercury sealed therein;
   an anode disposed in said light-emitting tube;
   a cathode disposed in said light-emitting tube, said cathode being positioned facing said anode; and
   a heat-release layer covering a substantial portion of an outer surface of said cathode, said heat-release layer being made of tungsten;
   wherein when said short-arc discharge lamp is provided with electricity having a current value of at least 50 A, an inter-electrode power value defined by a ratio Y/X is at least 500 W/mm, X being defined as a distance in millimeters between said anode and said cathode, and Y being defined as an input power in Watts provided to said short-arc discharge lamp.

2. The short-arc discharge lamp of claim 1, wherein said heat-release layer covers substantially all of said outer surface of said cathode except at a tip of said cathode.

3. The short-arc discharge lamp of claim 1, wherein said heat-release layer has a thickness in a range between 3.5 to 5.0 μm.

4. The short-arc discharge lamp of claim 1, wherein said heat-release layer is made of sintered tungsten powder.

5. The short-arc discharge lamp of claim 1, wherein said outer surface of said cathode includes a groove.

6. The short-arc discharge lamp of claim 5, wherein said groove on said outer surface of said cathode is a plurality of circular grooves.

7. The short-arc discharge lamp of claim 5, wherein said groove on said outer surface of said cathode is a helical groove.

8. The short-arc discharge lamp of claim 5, wherein said groove on said outer surface of said cathode has a pitch in a range between 0.1 to 0.5 mm.

9. The short-arc discharge lamp of claim 1, wherein said light-emitting tube has at least 25 mg/cc of mercury sealed therein.

\* \* \* \* \*